United States Patent

Cloud

Patent Number: 5,773,047
Date of Patent: Jun. 30, 1998

[54] MODEL FOR COMPOSITE TOOLING MOLD

[75] Inventor: David J. Cloud, Bethel, Pa.

[73] Assignee: The Boeing Company, Seattle, Wash.

[21] Appl. No.: 799,669

[22] Filed: Feb. 11, 1997

Related U.S. Application Data

[62] Division of Ser. No. 518,097, Aug. 22, 1995, Pat. No. 5,707,477.

[51] Int. Cl.$^6$ ..................................................... B29C 33/38
[52] U.S. Cl. ...................... 425/403; 249/114.1; 249/135; 264/219; 264/338; 425/470
[58] Field of Search ................................. 249/114.1, 134, 249/135; 425/403, 470; 264/219, 337, 338

[56] References Cited

U.S. PATENT DOCUMENTS

| | | |
|---|---|---|
| 3,418,695 | 12/1968 | Claflin . |
| 4,255,364 | 3/1981 | Talbert . |
| 4,620,890 | 11/1986 | Myers et al. ............................. 425/403 |
| 4,680,216 | 7/1987 | Jacaruso . |
| 4,803,108 | 2/1989 | Leuchten et al. . |
| 5,045,575 | 9/1991 | Gabayson . |
| 5,071,338 | 12/1991 | Dublinski et al. ....................... 425/470 |
| 5,139,843 | 8/1992 | Murakami et al. . |
| 5,344,685 | 9/1994 | Cassell .................................... 425/403 |
| 5,387,098 | 2/1995 | Willden ................................... 425/403 |

*Primary Examiner*—James P. Mackey
*Attorney, Agent, or Firm*—Mary Y. Redman

[57] ABSTRACT

A method for fabricating a model includes the steps of stacking successive layers of aluminium honeycomb core to a desired height to form a block, machining the block to within a desired tolerance of the desired final contour, applying a layer of modeling material such as syntactic epoxy to the outer surface of the block, and machining the layer of modeling material to the desired contour. The result is a model from which a mold or composite parts can be fabricated, using high temperature and pressure processes if desired.

9 Claims, 2 Drawing Sheets

MODEL FOR COMPOSITE TOOLING MOLD

This is a divisional of application Ser. No. 08/518,097 filed on Aug. 22, 1995, now U.S. Pat. No. 5,707,477. +gi This invention was made with Government support under the United States Government Contract Number N00019-93-C-006 awarded by the Department of Defense. The Government has certain rights to this invention.

FIELD OF THE INVENTION

This invention relates to the field of composite manufacturing and models for use therein.

BACKGROUND OF THE INVENTION

It is common in aerospace and automotive industries to fabricate a model from which a mold will be made. Composite parts are then fabricated from the mold. A model is normally used only once or twice as a pattern to generate a female shape, such as a mold or trim fixture for fabrication of composite parts. In the aerospace industry, it is desirable, but not currently feasible, to use fabrication and curing processes which subject the models to temperatures in excess of 350° F. and pressures to 100 psi. Prior art model fabrication processes yield models which can only be used in environments of up to 200° F. and 90 psi. Presently, a "building block" approach (illustrated in FIG. 1) is often used to fabricate a model. In this approach, modeling boards are laminated together to approximate the model shape and then are machined to form the desired shape. This model shape is then used as a model from which composite tooling molds (illustration in FIG. 2) are fabricated.

This method presents three problems. First, the cost to fabricate a model in this process can be very high. The manufacturing processes in which it would be desirable to use the model involve elevated temperatures and pressures, and drastic changes in humidity. The cost of raw materials which will withstand these conditions while maintaining dimensional accuracy are typically twice that of conventional modeling materials. The labor associated with bonding the boards together, which requires precision and skill to minimize bondline discrepancies, is also high. Overall model fabrication costs represent 60% to 70% of the total tooling costs, including fabrication of the tool/mold.

The second problem is caused by the bondlines at the adhesive joints between the modeling boards. Leakage at these bondlines is the number one cause of mold failure. Models that leak are responsible for most subsequent mold failures because they yield molds that leak. Voided bondlines are almost exclusively the cause of leakage in laminated molds. Furthermore, bondline adhesives generally contain a higher resin content than do the boards themselves. As a result, the bondlines show higher thermal expansion than the rest of the model even at relatively low processing temperatures such as 100° F., and worsen with increases in temperature. The expanded bondline leaves a depression or markoff in the next stage tool/mold, and subsequently the composite part which is fabricated in the mold.

The third major problem of this process is that models fabricated in this manner react poorly to the heating and cooling of the mold fabrication process. The thermal conductivity of syntactic modeling boards is extremely low. A large volume of this material is required to fabricate even a hollow model. Thus, the model will consist of a thermal mass which is extremely difficult to heat up and cool down. In addition, differences in thermal expansion throughout the model thickness cause internal stresses which often cause the model to crack, particularly on cool down. The higher the temperature range, the more difficult this is to manage in the thermal cycle. Moreover, currently available modeling materials are not formulated with resin systems capable of withstanding temperatures much above 200° F.

What is needed then is a model and method of fabricating a model which is characterized by a low cost, a smooth seamless surface free of bondlines, and stability in the high temperature environment (350° F.) and changes in humidity to which it will be subjected in further manufacturing processes.

SUMMARY OF THE INVENTION

The invention is a model and method of fabricating a model which meets these needs in the industry. This includes fabricating a mold from the model requiring 100° F. to 160° F. and 90 psi. model capabilities. This also includes fabricating fly-away composite parts directly on the model with processes requiring 350° F./90 psi. capabilities, thus eliminating the need for a mold and the associated fabrication costs.

A method for fabricating a model according to the invention includes the steps of stacking successive layers of aluminum honeycomb core to a desired height to form a block, machining the block to within a desired tolerance of the desired final contour, applying a layer of modeling material such as syntactic epoxy to the outer surface of the block, and machining the layer of modeling material to the desired contour.

In a preferred embodiment of the invention, a base is fabricated with a top plate of aluminum. A layer of perforated aluminum honeycomb core is bonded to the aluminum base plate. Successive layers of perforated aluminum honeycomb core are then bonded atop each other with a suitable adhesive until the desired height is reached. The stack of aluminum honeycomb core layers is then machined to the desired tolerance under the desired final contour. Then, a layer of syntactic epoxy is applied to the machined aluminum core surface. The epoxy layer is cured and then machined to the final contour desired. It is then sealed with an epoxy sealer. The result is a model from which a mold or composite parts can be fabricated, using high temperature and pressure processes if desired.

DETAILED DESCRIPTION OF A PREFERRED EMBODIMENT

Figures 3, 4:
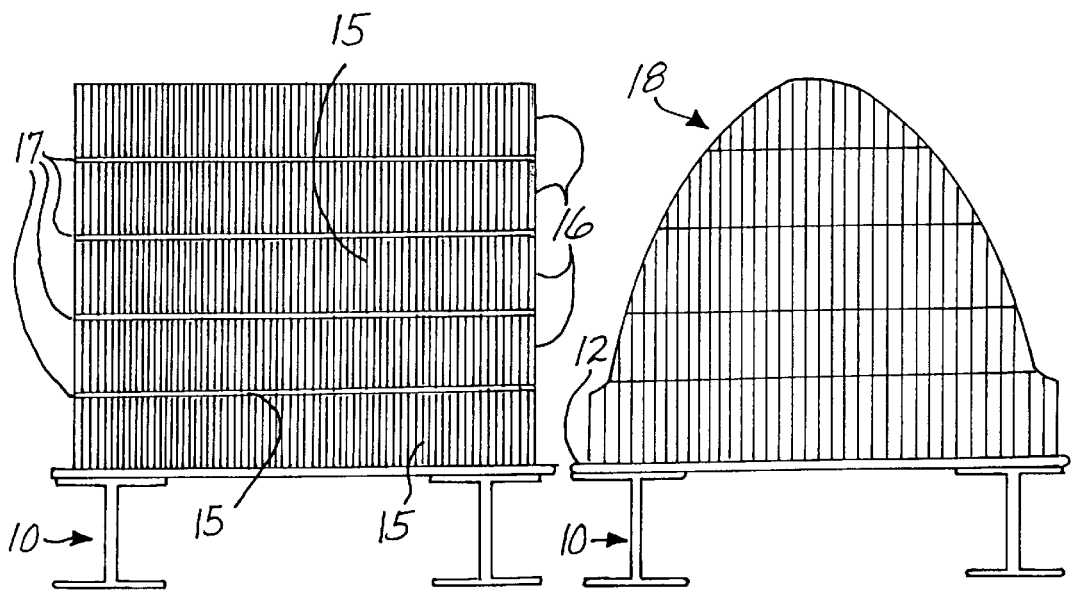
FIGS. 3 through 6 show cross-sections of a model being fabricated by a process according to a preferred embodiment of the invention.

Referring first to FIG. 3, in a preferred embodiment of the invention a base 10 is fabricated in a manner so as to support the finished model. The top plate 12 of the base is an aluminum plate. A first layer 14 of perforated aluminum honeycomb core is bonded to the aluminum base plate 12 using a suitable adhesive, such as RTV silicone. If the finished model requires a wide width, one or more aluminum honeycomb core sheets can be bonded to the base plate 12 next to each other. Such side joints are permissible and do not require adhesive.

Next, successive layers of perforated aluminum honeycomb core 16 are bonded on top of each other using an adhesive 17 such as a 350° F. foaming adhesive. Side joints 15 in the resulting stack are permissible and do not require an adhesive. However, side joints are preferably staggered by a minimum of 12 inches. When a sufficiently high stack of aluminum honeycomb core sheets have been bonded together, the stack is weighted evenly over the top layer with sufficient pressure to seat the horizontal core joints. The adhesive is then cured per adhesive manufacturer's instructions to a maximum temperature of 350° F., preferably.

Referring now to FIG. 4, the resulting block 18 of aluminum honeycomb core layers is then machined to the desired tolerance to form an intermediate contour. Preferably, this will be about 0.5" under the desired final contour. Then, with reference to FIG. 5, a layer of syntactic epoxy compound 20 is applied to the outer surface of the machined core model. Any two-part mixed or one-part frozen syntactic epoxy with 350° F. capability would suffice. Preferably, this is accomplished by applying syntactic epoxy patties to the machined surface, and then forming the patties into a continuous layer by kneading the patties together and "seating" them into the core cells with moderate hand pressure. The patties are preferably 0.75" to 1" thick. The syntactic epoxy is then cured at room temperature first and then post-cured at 350° F. per manufacturer's instructions.

Figures 5, 6:
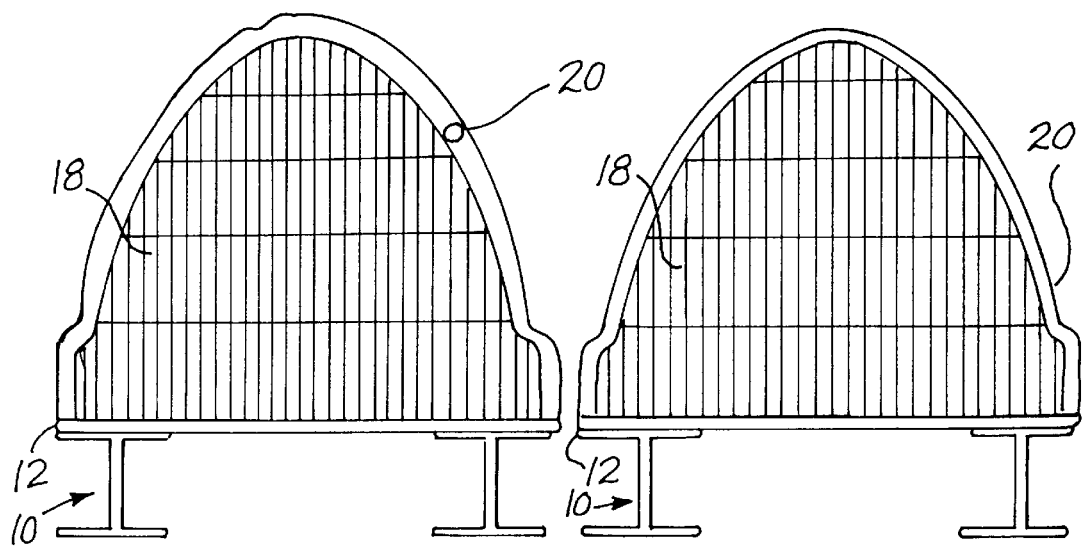

Referring now to FIG. 6, after curing, the epoxy layer 20 is machined to the final contour. In a preferred embodiment, this entails removing approximately 0.25" of material. The outer surface is then sealed using an epoxy sealer.

Figure 1:
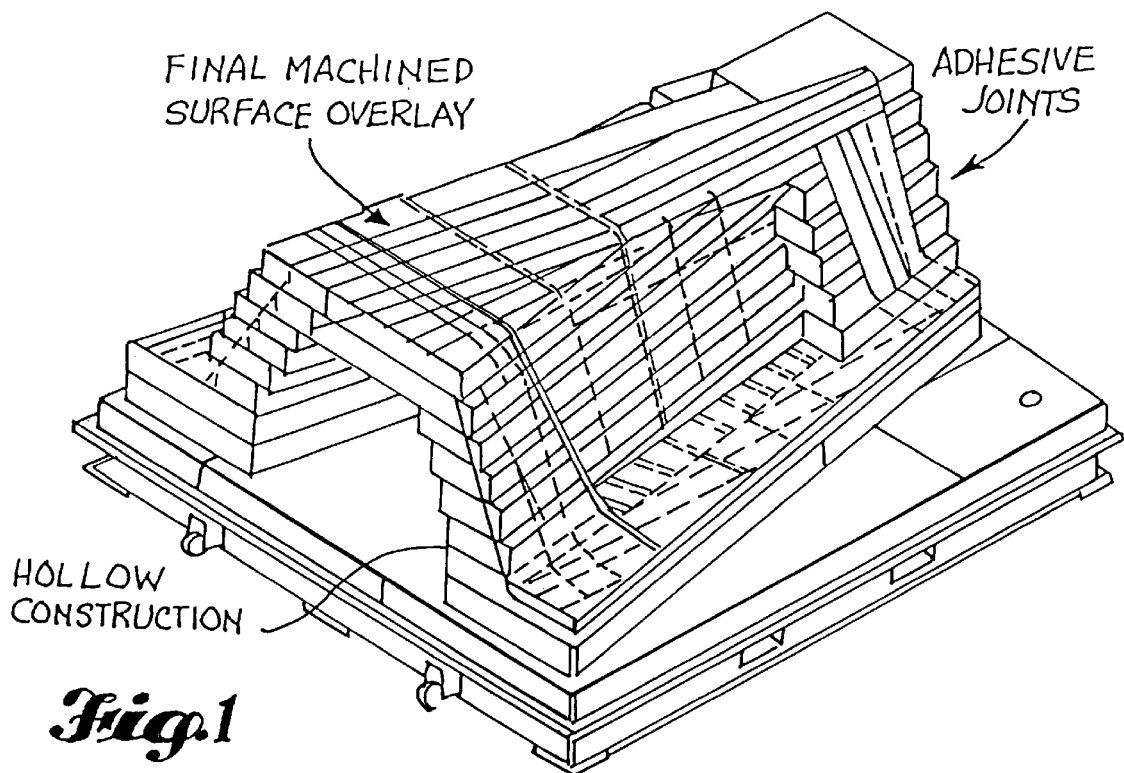
FIG. 1 illustrates an example of the use of laminated modeling boards in a prior art modeling method.
Figure 2:
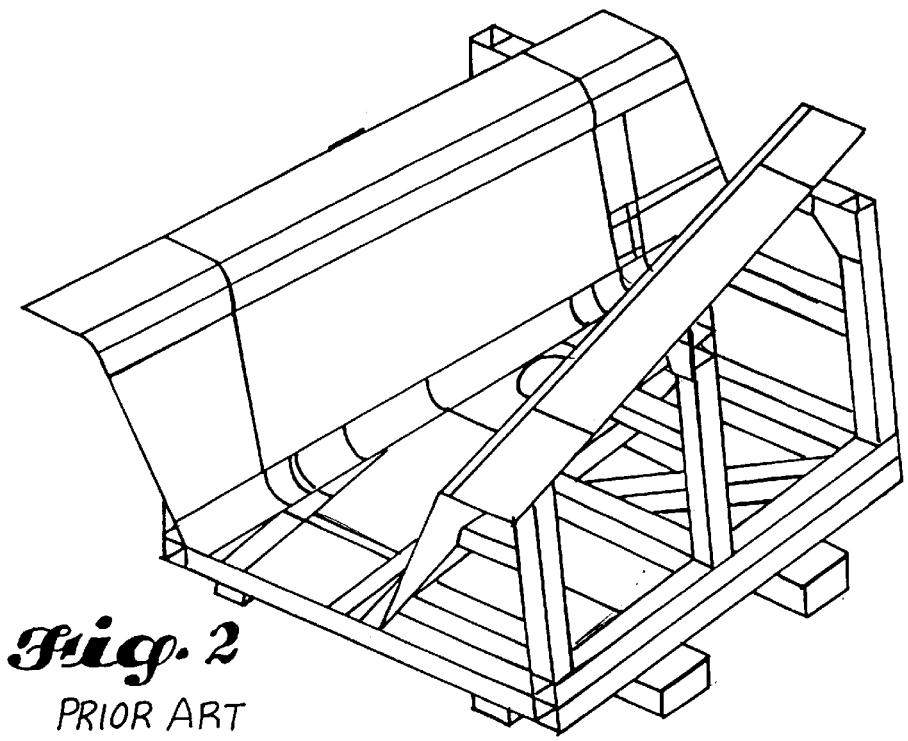
FIG. 2 illustrates an example of the composite tooling mold fabricated using the modeling method of FIG. 1.

It will be apparent to those skilled in the art that the total fabrication cost of a model using this method is considerably less expensive than the conventional method illustrated in FIGS. 1 and 2. The resulting model surface is seamless and free of bondlines. This eliminates markoff on the final part and also eliminates potential vacuum leak paths.

This method is further advantageous in that the amount of syntactic material used is greatly reduced over the conventional method since only a thin layer 20 is used over an aluminum core material. Since syntactic materials are inherently hygroscopic, their moisture absorption causes some dimensional change over time. By minimizing the amount of syntactic material used, the dimensional change as the result of moisture absorption is greatly reduced.

This method is further advantageous in that only one finishing machining pass on the syntactic epoxy surface is required. The rest of the machining is performed on aluminum substrate. Since aluminum core will machine many times faster than syntactic modeling materials, this is very desirable. Also, it reduces the need for dust control systems to eliminate potentially hazardous dust.

The resulting model is further advantageous in that because of aluminum's high thermal conductivity, the heat up rates are considerably faster and the model can withstand higher heat limitations without the risk of thermal cracking. In addition, the perforations in the cell walls of the aluminum core allow the autoclave pressure to equalize inside the core cells. This places a compressive load on each side of the syntactic epoxy face only and not on the total model as in typical prior art systems. A model formed according to the preferred embodiment, functions well for curing 350° F. epoxy resin systems at 90 psi. commonly used in fly-away composite parts. This is a marked improvement over the 200° F. capability of the typical prior art system.

It will be understood that the invention has been described with reference to a preferred embodiment thereof for illustrative purposes. The invention is not limited to the particular embodiment describe above, but that various changes and modifications may be made without departing from the spirit and scope of this novel concept as defined by the following claims.

What is claimed is:

1. A model comprising:
    a stack of aluminum honeycomb core layers;
    a layer of modeling material applied to at least a portion of the outer surface of said stack, cured and machined to form the outer surface of the model.

2. The model of claim 1 wherein said modeling material comprises a syntactic epoxy.

3. The model of claim 2 wherein said aluminum honeycomb core comprises perforated aluminum honeycomb core.

4. The model of claim 3 wherein said stack comprises stacked layers of aluminum honeycomb core with adjacent layers bonded together.

5. The model of claim 4 wherein said adjacent layers of aluminum honeycomb core are bonded together with an adhesive disposed therebetween.

6. The model of claim 3 wherein said stack has an outer surface within a desired tolerance under the outer surface of the model.

7. A model fabricated according to the process comprising the steps of:
    stacking successive layers of aluminum honeycomb core to a desired height to form a block;
    machining at least a portion of said block to within a desired tolerance of a desired contour;
    applying a layer of modeling material to at least a portion of the outer surface of said block; and,
    machining said layer of modeling material to the desired contour.

8. The model of claim 7 wherein said modeling material comprises a syntactic epoxy.

9. The model of claim 8 wherein said aluminum honeycomb core comprises perforated aluminum honeycomb core.

* * * * *